United States Patent [19]

Lachner et al.

[11] Patent Number: 5,096,048
[45] Date of Patent: Mar. 17, 1992

[54] CONVEYOR

[75] Inventors: Hans Lachner; Hans G. Warnke, both of Herne; Jörg Richter, Bochum, all of Fed. Rep. of Germany

[73] Assignee: Klockner-Becorit GmbH, Castrop-Rauxel, Fed. Rep. of Germany

[21] Appl. No.: 613,952

[22] Filed: Oct. 24, 1990

Related U.S. Application Data

[63] Continuation of Ser. No. 822,751, Jan. 27, 1986, abandoned, which is a continuation-in-part of Ser. No. 731,843, May 8, 1985, abandoned, which is a continuation-in-part of Ser. No. 547,945, Nov. 2, 1983, abandoned.

[30] Foreign Application Priority Data

| Nov. 6, 1982 | [DE] | Fed. Rep. of Germany | 3241129 |
| Jul. 12, 1983 | [DE] | Fed. Rep. of Germany | 3325094 |
| Apr. 18, 1985 | [DE] | Fed. Rep. of Germany | 3514049 |
| Jul. 9, 1985 | [DE] | Fed. Rep. of Germany | 3524429 |
| Aug. 14, 1985 | [DE] | Fed. Rep. of Germany | 3529120 |
| Oct. 7, 1985 | [DE] | Fed. Rep. of Germany | 3535735 |

[51] Int. Cl.⁵ .............................. B65G 19/08
[52] U.S. Cl. .................. 198/733; 198/735.6; 198/834; 198/861.2
[58] Field of Search .......... 198/330, 729-731, 198/733, 734, 735.6, 834, 861.2; 474/152-158

[56] References Cited

U.S. PATENT DOCUMENTS

| 984,304 | 2/1911 | Seeberger | 198/330 |
| 2,304,603 | 12/1942 | Schroeder | 198/730 |
| 2,320,834 | 6/1943 | Schroeder | 198/730 |
| 2,903,122 | 9/1959 | Geilenberg | 198/861.2 |
| 3,262,547 | 7/1966 | McCauley et al. | 198/730 |
| 3,495,468 | 11/1968 | Griffel | 474/157 |
| 4,332,317 | 6/1982 | Bahre et al. | 198/735 |

FOREIGN PATENT DOCUMENTS

| 3339404 | 5/1984 | Fed. Rep. of Germany | 198/735 |
| 1126122 | 11/1956 | France | 198/730 |
| 19753 | of 1899 | United Kingdom | 198/834 |
| 688748 | 3/1953 | United Kingdom | 198/729 |
| 1373170 | 11/1974 | United Kingdom | 198/861.2 |
| 2127520 | 4/1984 | United Kingdom | 198/731 |

Primary Examiner—Joseph E. Valenza
Attorney, Agent, or Firm—Collard, Roe & Galgano

[57] ABSTRACT

There is provided a self-propelled conveyor for use in mining operations having an endless revolving conveyor strand driven in its longitudinal direction by intermediate drives and guided on a conveyor frame which consists of segments multi-directionally pivotally connected to one another along the central longitudinal axis of the conveyor. The conveyor frame has downwardly extendible support elements which, for the conveying operation, lift the conveyor strand reversing in the lower stringer from the ground when the support elements are extended. For the transporting operation, the support elements are retracted so as to permit the strand to lie on the ground. Between the segments of the conveyor frame disposed in the front region of the conveyor there are steering cylinders by means of which the angle between these segments can be adjusted so as to direct the longitudinal direction of the conveyor.

15 Claims, 9 Drawing Sheets

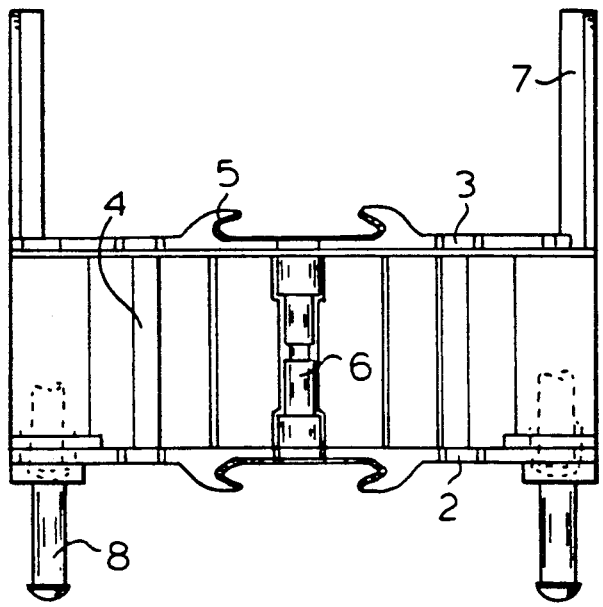
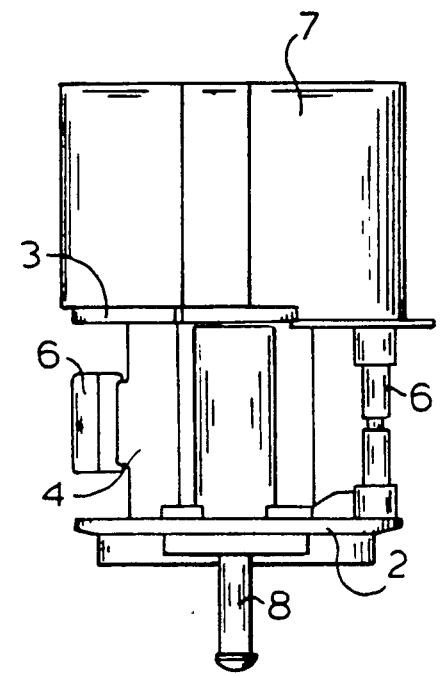
FIG.4  FIG.5
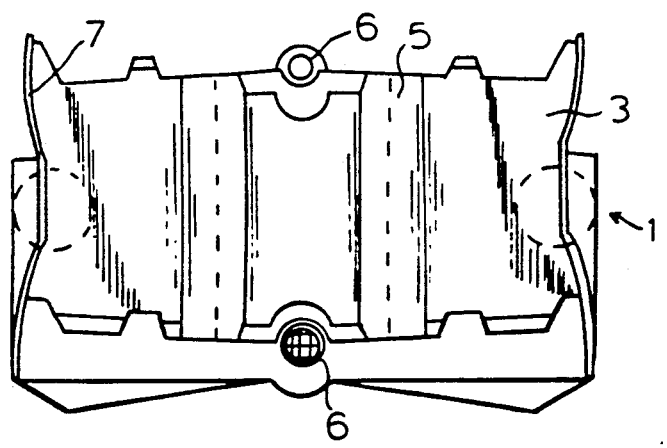
FIG.6

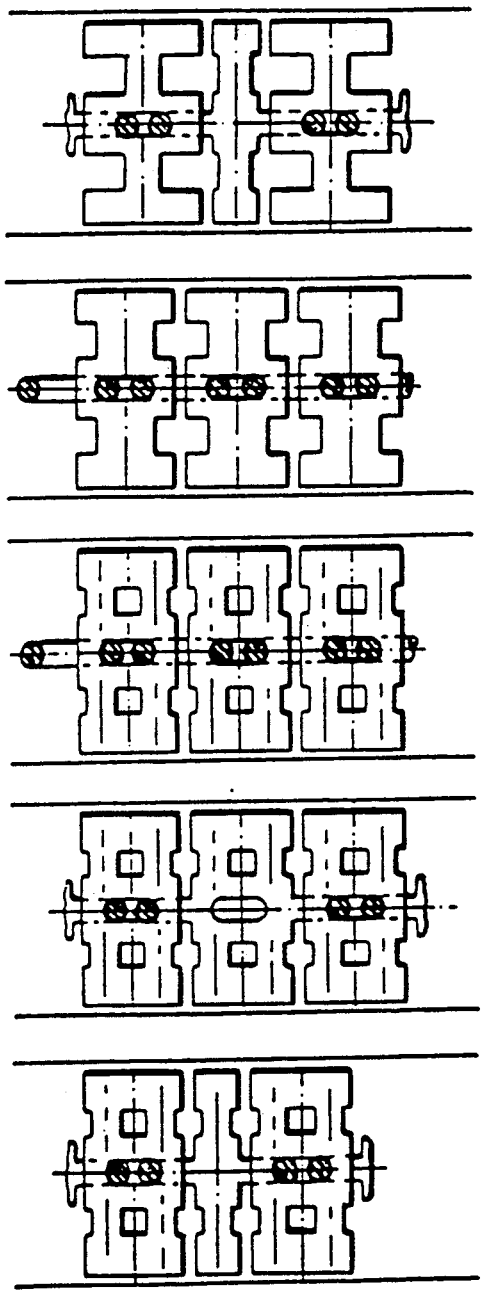
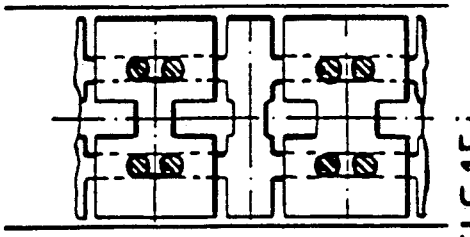
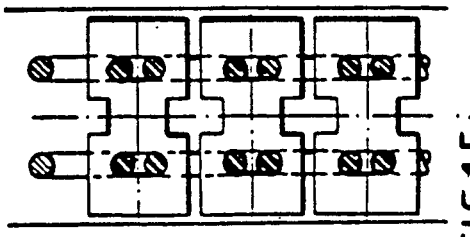
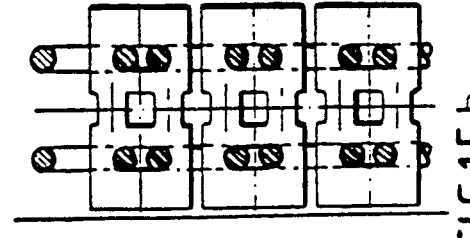
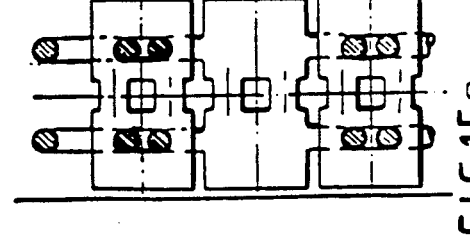
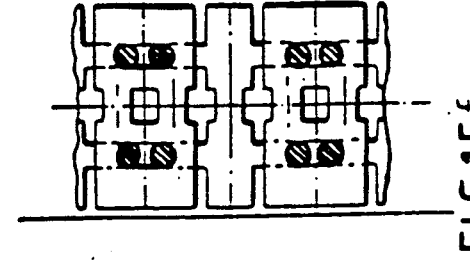
FIG.15a FIG.15b FIG.15c FIG.15d FIG.15e FIG.15f FIG.15g FIG.15h FIG.15i FIG.15j

CONVEYOR

This is a continuation of copending application Ser. No. 06/822,751 filed on Jan. 27, 1986, now abandoned, which, in turn, is a continuation-in-part of copending application Ser. No. 06/731,843, filed May 8, 1985, now abandoned; which, in turn, is a continuation-in-part of copending application Ser. No. 06/547,945, filed Nov. 2, 1983, now abandoned.

The present invention relates to a scraper conveyor for use in mining operations having an endless revolving conveyor strand which is driven in its longitudinal direction by intermediate drives and which is guided on a conveyor frame consisting of segments which are multi-directionally pivotally connected to one another along the central longitudinal axis. The conveyor frame is provided with downwardly extendible support elements which lift the conveyor strand that is reversing in the lower stringer from the ground when the support elements are extended and permit the lower stringer to lie on the ground when they are retracted. The conveyor frame also has, between the segments of the conveyor frame disposed in the front region of the conveyor, steering cylinders which are adapted to adjust the angle between these segments.

A conveyor is shown and described in British Patent 13 73 170 wherein the conveyor can be moved or propelled by the driving force of its conveyor drives in its longitudinal direction, if necessary even through curves, when the support elements are retracted thereby permitting the lower stringer of the conveyor strand to lie on the ground. After advancement, the conveyor can be brought into the conveying position again by extending the support elements thereby lifting the conveyor strand revolving in the lower stringer from the ground.

As a result of these characteristics, a conveyor of this type, in principle, is suitable for application in underground mining because it is able to follow the progressing extraction of coal and minerals by advancing in the longitudinal direction. This characteristic is of great advantage, particularly in the so-called room and pillar mining system. However, the particular conveyor described in this British patent is not suitable for underground mining applications for several reasons. First of all, the conveyor strand of this British patent is a plate conveyor which is guided by stationary guides and supported therein by rollers. Thus, dirt which is always present in underground mining or penetrating water may interfere with the roller bearings and roller guides so that the rollers quickly come out of round and proper operation is rendered impossible. In addition, the weight of the parts of such a conveyor is very great, so that during the conveying operation a large portion of the power is consumed in moving this revolving mass. Another problem is that the intermediate drives have a comparatively large overall height and overall length because of the drive chains which are used to drive the conveyor strand. This great overall length negatively influences the curve negotiating characteristics of the conveyor since the intermediate drives must pass through the curves to be negotiated which may be tight or have a small radius of curvature. Finally, the conveyor according to this British patent does not address or solve the problems concerning the stretching and the curve negotiating characteristics of the conveyor strand itself. As a result of the forces introduced into the conveyor strand by the intermediate drives, the conveyor strand stretches to a certain degree before engagement with each intermediate drive. This stretching must be compensated for as the strand leaves the intermediate drive in a suitable manner. If this stretching is not compensated for, difficulties relating to the guidance of the conveyor strand leaving the intermediate drive and the running into the next intermediate drive occur. Similar difficulties are incurred when the conveyor strand is run into the next intermediate drive in a curve. In a curve, changes in pitch arise due to the swivelling or pivoting of the conveyor segments. These changes in pitch make it impossible for the drive chains of the intermediate drives utilized in this British patent to properly engage the conveyor strand.

In such mobile conveyors, therefore, a displaceability or clearance between the conveyor links which are connected in the form of a chain is required so that the conveyor strand is capable of traveling through curves and so that it may be adapted to irregularities in the course of the conveying or mining line. More importantly, with such conveyors having intermediate drives, displaceability of the conveyor links with respect to each other is needed, in order to control the problems at the discharge end of the intermediate drives resulting from the stretching or elongation of the conveyor strand. The conveyor strand leaving the intermediate drive, when a displaceability of the conveyor links is provided for, is slack and can thus be pushed with the links compressed together without problems. The displaceability of the conveyor links with respect to each other is the subject of U.S. Pat. No. 4,332,317, to Bähre et al., granted June 1, 1982. However, in engineering such conveyors with intermediate drives, it is difficult to correctly determine the degree or measure of the displaceability or clearance of the conveyor links forming the chain conveyor. In order to avoid the pushed or compressed section of the chain becoming too long when the chain is slack as it runs off the intermediate drive, the measure of displaceability between consecutive conveyor links must be as great as possible. This would be advantageous also in view of tight curve radii through which the conveyor may have to travel. However, if the measure of displaceability is excessive, there is the danger that the engaging elements or sprockets of the drive wheel of the intermediate drive will run up on the engaging elements of the conveyor links and become damaged if, for example, the conveyor links run into the drive wheel in the pushed or compressed state. Thus, a smooth and continuous engagement with the drive wheel when the conveyor links are pushed together requires the smallest possible measure of displaceability, which would, however, impair the capability of the chain formed by the conveyor links to travel through curves.

It is, therefore, the object of the present invention to provide a scraper conveyor for use in mining operations which can be self-propelled in its longitudinal direction wherein the conveyor links have a displacement between one another so that a smooth and continuous engagement with the drive wheel is provided without impairing the ability of the conveyor to travel through curves.

The above object is accomplished in accordance with the present invention by providing a self-propelled scraper chain conveyor which includes an endless revolving conveyor strand driven by intermediate drives and guided by guides centrally disposed along the conveyor frame and support elements, downwardly extendible from the conveyor frame, which lift the conveyor strand reversing in the lower stringer from the ground when the support elements are extended and permit the strand to lie on the ground when retracted. The conveyor frame is formed of segments which are multi-directionally pivotally connected together along the central longitudinal axis of the conveyor so as to permit the conveyor frame to pass through curves both in the horizontal and vertical planes. Steering cylinders are provided between the segments in the front region of the conveyor frame so as to adjust the angle between these segments. The conveyor frame is formed as a chute and the conveyor chain carries scraper elements which are driven along the chute by the conveyor chain.

In order to permit negotiation of curves by the conveyor, the conveyor links which are connected together in the form of a chain are displaceable with respect to one another as a function of the number of teeth of the drive wheels of the intermediate drives and the pitch of the engagement elements of the drive wheels and are adapted to abut one another when in the telescoped or compressed condition. The drive wheels of the intermediate drives are formed as toothed gear wheels, such as rack and pinion gear wheels, which directly engage both the upper as well as the lower stringers of the conveyor chain. The maximum amount of displaceability between the conveyor links can be approximated by use of the formula $$e = \frac{0.3t}{z}(z - 9)$$

where:
 e = the amount of displaceability between adjacent conveyor links;
 t = the pitch of the drive wheels, i.e. the dimension between the sprockets or teeth of the drive wheels; and
 z = the number of engaging elements or sprockets of each drive wheel (the minimum number being ten).

In addition, the operating surfaces of the engaging elements of the drive wheels and/or of the conveyor links are corrected as compared to the shape for constant mesh (i.e. when the chain link engages with a chain wheel sprocket from the top of the chain wheel sprocket to the bottom thereof) in a way such that the top halves of the operating surfaces are bent backwardly towards their plane of symmetry, i.e. tapered, to such an extent that the sum of the deviations of a pair of operating surfaces equals the amount of displaceability between the conveyor links.

Thus, with the drive as described above, the geometric conditions and dimensional ratios result in a smooth contact being established first between the backwardly bent top halves of the operating surfaces of the engaging elements in the presence of any possible spacing errors, and subsequently with the further rotation of the drive wheels, the site of contact between the operating surfaces is smoothly displaced to the lower halves of the operating surfaces. The shape of the lower halves of the engaging elements conforms to the geometrically given shape for constant mesh with the predetermined basic spacing or pitch. It has been found that a constant or steady transfer of force is achieved with such corrected operating surfaces only if at least one engagement contact is present or established between the lower halves of a pair of operating surfaces. In order to assure such contact, it is necessary that there be a defined minimum number of engaging elements of each drive wheel and a defined limitation of the amount of displaceability of the conveyor links, the latter of which depending on the number of engaging elements of the drive wheel. A constant and smooth, shockless transfer of force is assured only if these dimensioning rules are observed.

Thus, with a given diameter of the drive wheels, the number of engaging elements must be as small as possible if a large amount of conveyor link displaceability is required. In order to permit the smallest possible number of engaging elements combined with a simple design and good capability of the chain to travel through curves, it is preferable that each conveyor link has as its engaging element a bolt extending crosswise with respect to the longitudinal direction of the chain, with connection elements in the form of ring-shaped eyes secured on the longitudinal sides of the bolt at the front and back thereof. The planes defined by the connection eyes of each link are developed to extend perpendicularly to one another. Such a design of the conveyor links permits a particularly close arrangement of the engaging elements of the chain because very little space is required for the connecting elements between the adjacent conveyor links. Because such a conveyor chain is comprised of identical links, its manufacture is especially favorable in terms of cost. Furthermore, as a result of this type of connection between the individual conveyor links, the chain is substantially as flexible as a normal chain consisting of round links.

A scraper chain conveyor as described above does not require roller guidances between the chute and the conveyor chain and in comparison to a plate conveyor, a small amount of revolving mass is required to be moved. The use of intermediate drives, disposed longitudinally along the conveyor, in combination with the telescopic conveyor chain, that can be pushed in telescoped position, makes possible very low chain tensions in the longitudinal region of the scraper chain. At every intermediate drive the chain tension is removed completely. Low chain tension is a precondition for the curve negotiating characteristics according to the present invention, because large chain tensions in the curve region tend to change the direction of movement of the conveyor chain.

The use of intermediate drives having a toothed drive wheel engaging directly in the upper stringer as well as in the lower stringer makes it possible for the intermediate drives to have small dimensions so that they do not interfere with the curve trace of the conveyor even when curves of small radii are negotiated.

The use of intermediate drives longitudinally along the conveyor in combination with a chain, telescopic in its guide, makes it necessary, however, to take care that the chain, even in the telescoped position, is able to be perfectly engaged by the drive wheel of the intermediate drive. For example, on inclined planes or in the region of curves, the chain may be required to run in the drive wheel of the intermediate drive in completely or partly telescoped or compressed position. Similar difficulties occur if, during advancement of the conveyor with retracted support elements, the drive wheel of the intermediate drive is required to engage a compressed segment of the conveyor chain. Due to the telescopic characteristic of the conveyor chain the resulting changes in pitch are considerable. However, as pointed out above, these changes in pitch are neutralized according to the present invention by limiting the clearance between chain links as a function of the pitch and the number of teeth of the drive wheel and by correcting the profile of the engaging elements of the drive wheel and/or of the chain as compared with the toothing determined for constant mesh.

On the whole, the present invention results in a sturdy and simple scraper chain conveyor which is capable of advancing under its own force with good curve negotiating characteristics and which is especially suitable for the harsh working conditions found in underground mining.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views:

FIGS. 4, 5 and 6 are a front view, a side view and a plan view, respectively, of a segment of the conveyor frame without the conveyor chain;

FIG. 12a is a plan view of a conveyor chain consisting of another embodiment of a conveyor link in accordance with the present invention;

FIG. 12b is a side elevational view of the conveyor chain shown in FIG. 12a;

FIGS. 15a to 15j show schematic top views of various embodiments of conveyor chains guided in guide means, said chains being comprised of different elements;

Figure 1:
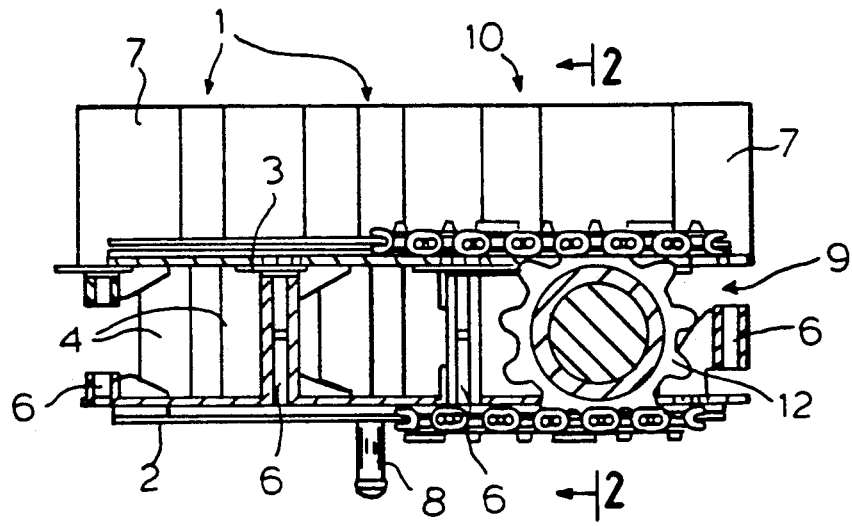
FIG. 1 is a vertical, longitudinal cross-sectional view of a portion of the conveyor of the present invention.
Figure 2:
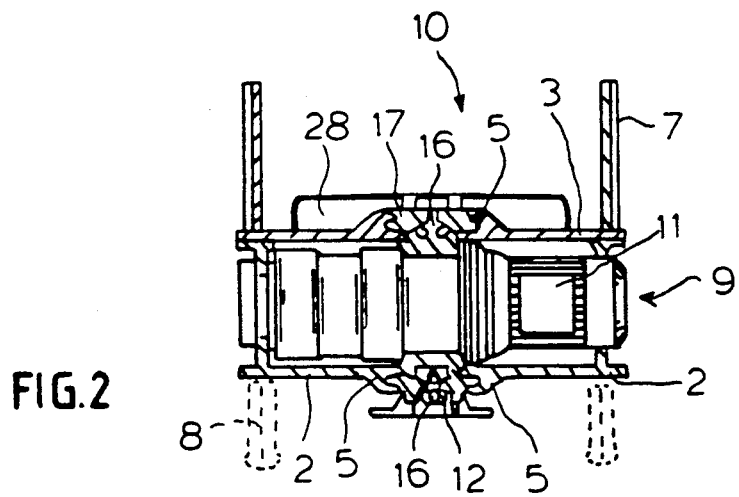
FIG. 2 is a vertical, cross-sectional view of the conveyor taken along line II—II of FIG. 1.
Figure 3:
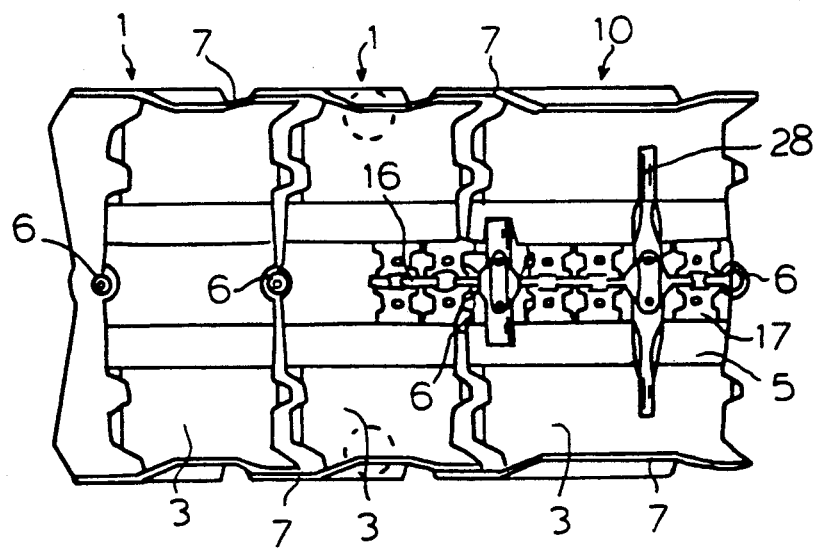
FIG. 3 is a plan view of the portion of the conveyor of FIG. 1.
Figure 7:
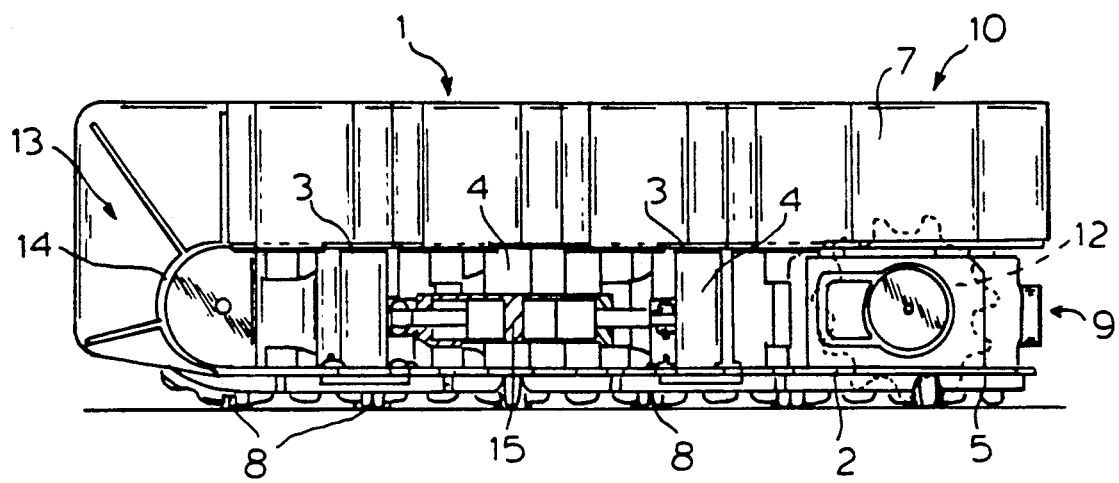
FIG. 7 is a side view, partly in section, of the front region of the conveyor of the present invention.
Figure 8:
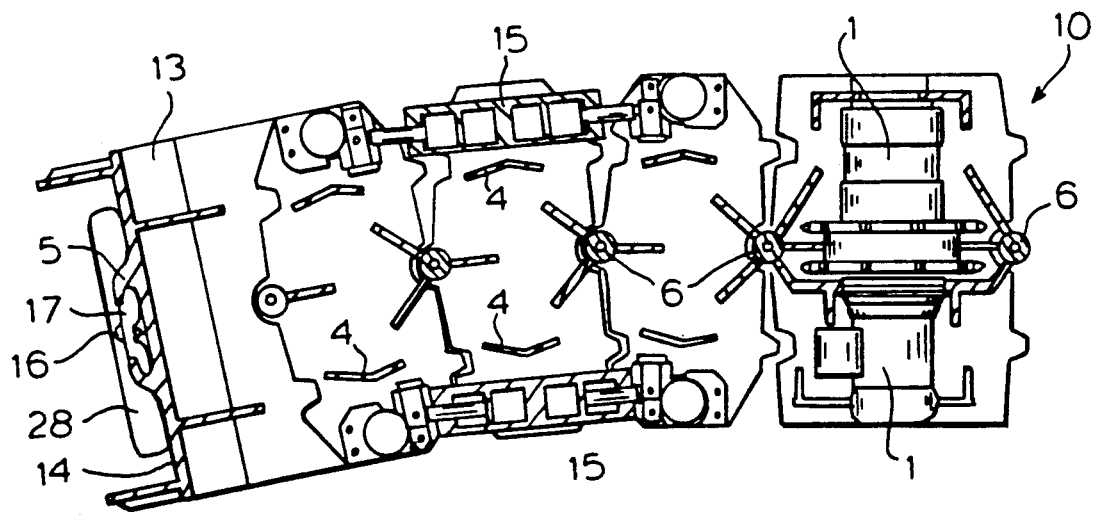
FIG. 8 is a horizontal, cross-sectional view of the front region of the conveyor of FIG. 7.

Now turning to the drawings and particularly to FIGS. 1 to 8, it can be seen that the segments of the conveyor frame disposed in the longitudinal direction of the conveyor are indicated with the reference numeral 1. Each frame segment 1 consists of a bottom plate 2 and a cover plate 3, which are connected into a box-shaped structure by vertical connecting plates 4. Centrally on the top side of cover plate 3 and the bottom side of bottom plate 2, there is a chute-shaped guide 5 running in the longitudinal direction of the conveyor for the revolving conveyor chain, which will be described hereinafter.

Individual segments 1 of the conveyor frame are connected with one another by pin joints 6 having a vertically running hinge shaft, which are disposed along the central longitudinal axis of the conveyor frame, at the front and at the back of each segment 1. Pin joints 6 permit a restricted pivoting of adjoining frame segments 1 in the horizontal plane, such that the conveyor is able to pass through curves with a curve radius of about four meters. Moreover, pin joints 6 permit a limited pivoting in the vertical plane, such that the conveyor can pass through vertical curves with a curve radius of fifteen meters. In the longitudinal direction of the conveyor, however, pin joints 6 are back-lash free, so that the length of the conveyor frame cannot change. At the sides of segments 1 upwardly protruding side plates 7 are fastened. These side plates 7 and cover plate 3 overlap in the longitudinal direction of the conveyor, such that in spite of the pivoting of the individual segments a tight supply chute is thereby formed.

Every second segment 1 is provided at both sides with pressure-fluid actuated vertically extendible support elements 8. The lift of support elements 8 is such that the conveyor chain led in guide 5 of bottom plates 2 lies on the ground when support elements 8 are retracted and thereby carries and transports the whole conveyor (advancement position of the conveyor). When support elements 8 are extended the whole conveyor frame is lifted, so that the conveyor chain is out of contact with the ground (conveying position of the conveyor).

Longitudinally along the conveyor, intermediate drives 9 are disposed at comparatively short distances of 6 to 15 meters. The intermediate drives are located in segments 10 of the conveyor frame, the design of which corresponds to a large extent to segments 1 described above. Segments 10 are only somewhat longer than segments 1, but no more than twice as long. In segments 10 carrying intermediate drives 9 a gear motor is installed that drives a drive wheel 12, which is provided as a toothed pin gear wheel and will hereinafter be described in detail. The teeth of this drive wheel 12 pass through corresponding openings in bottom plate 2 and cover plate 3 and directly engage the conveyor chain led in guide 5, as will be explained in detail hereinafter. It is also possible to provide two drive wheels for each intermediate drive one engaging the lower stringer of the conveyor chain and one engaging the upper stringer as clearly seen in FIG. 17 and described hereinafter.

At the front of the conveyor (see FIGS. 7 and 8), a reversing element 13 is located, where bottom plate 2 and cover plate 3 are connected with one another by a suitably curved plate 14, on the outside of which guide 5 for the conveyor chain is disposed. At its rear side, reversing element 13 is provided with a pin joint 6 in order to connect it with the adjacent segment 1 of the conveyor frame. Between reversing element 13 and the first segment 1 as well as between this segment 1 and the subsequent segment 1, there are steering cylinders 15 which horizontally adjust the angle between these segments in order to establish the advancement direction of the conveyor.

Figure 9:
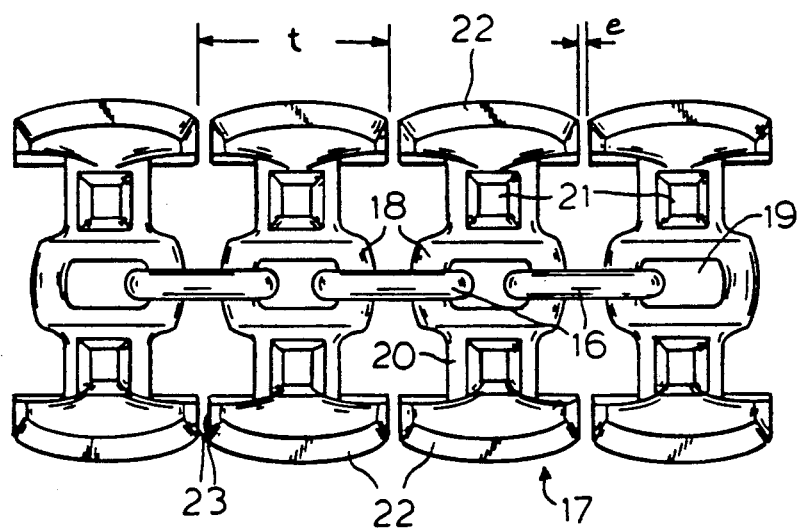
FIG. 9 is a plan view of a portion of the conveyor chain.
Figure 10:
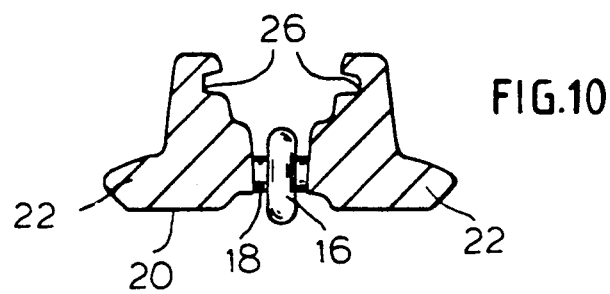
FIG. 10 is a vertical, cross-sectional view of a conveyor link of the conveyor chain.

The conveyor chain, as seen in FIGS. 9 and 10, consists of vertically disposed round chain links 16 and specially shaped horizontal conveyor links 17. Horizontal conveyor links 17 have a central section 18 with an opening 19, in which the two vertical chain links 16 of the adjacent conveyor links engage. On each side of central section 18 there are provided drive pins or engaging elements 20, which basically have a circular shape and are provided with rounded, opposing symmetrical operating surfaces 20a and 20b (see FIG. 11). Drive pins 20 have at their free ends guide shoulders 22, which engage with guides 5 for guiding the conveyor chain. Guide shoulders 22 are outwardly rounded off, so that the horizontal conveyor link 17 can pivot about a vertical axis in guide 5 and so that it is self-locking free (i.e. non-binding) when the conveyor chain is being pushed through guide 5. At the front side and at the rear side of guide shoulders 22 there are provided stop surfaces 23, with which the adjacent horizontal conveyor links 17 can abut with one another when the conveyor chain is pushed or compressed into guide 5 or passes through sufficiently tight curves.

Stop surfaces 23 on the one hand and round chain links 16 connecting the conveyor links on the other hand limit or define the amount (e) by which conveyor links 17 can be displaced against each other in the longitudinal direction of the chain. This amount (e) is substantially greater than the clearance or play required for the flexibility of the chain. With the chain stretched, the spacing between operating surfaces 20a or 20b of adjacent conveyor links 17 conforms to the basic division (t) or pitch of the engagement elements formed by the conveyor links.

Figure 11:
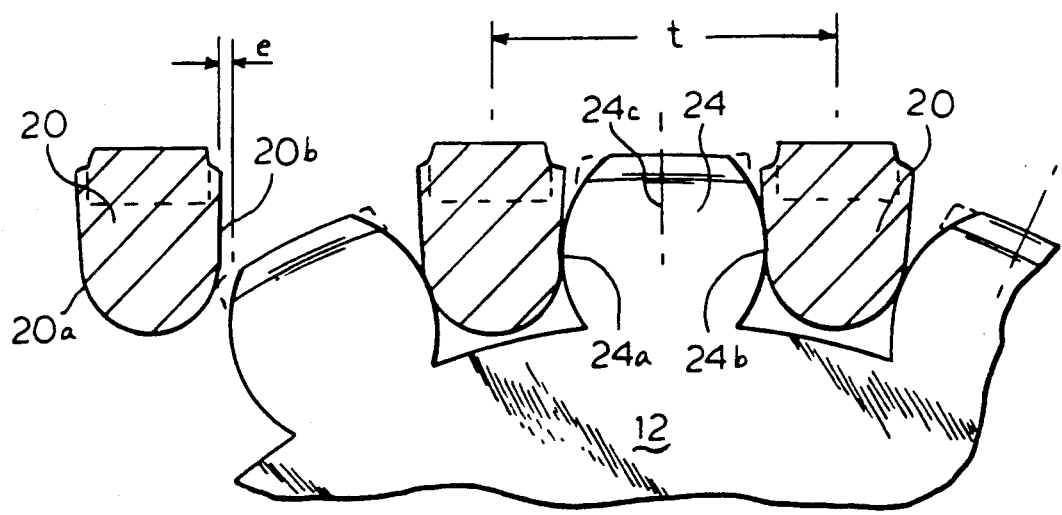
FIG. 11 is a partial cross-sectional view of a portion of a conveyor drive wheel showing the engagement conditions at the drive wheel of the intermediate drive.

FIG. 11 shows a segment of a drive wheel 12 engaging the engaging elements 20 of a conveyor link 17. The drive wheel is connected with a rotary drive not shown in the drawing. Drive wheel 12 is provided with engaging elements or sprockets 24, each of which having two opposing or mirror-inverted symmetrical operating surfaces 24a and 24b.

In order to have perfect conditions of engagement even when engaging elements 20 are pushed or compressed together by the amount (e), the amount (e), according to the invention, is dependent to a certain degree on the pitch (t) and the number (z) of engaging elements 24 of drive wheel 12. In order that engaging elements 20 smoothly mesh with drive wheel 12, even when conveyor links 17 are pushed together or compressed, without running up on engaging elements 24, the amount (e) of displacement must be limited in a defined way, on the one hand, and the shapes of the operating surfaces of the engaging elements 20 and/or 24 must be corrected in a defined way, on the other hand. It has been determined that an approximation of the maximum amount of displaceability between the conveyor links is given by the following equation:

$$e = \frac{0.3t}{z}(z-9)$$

e = the amount of displaceability between the conveyor links;
t = the pitch of drive wheel 12, i.e. the distance between the centers of engaging elements 24; and
z = the number of engaging elements 24 of drive wheel 12, being not less than ten.

For example: with a number of teeth z = 13 and a pitch t = 100 mm, the amount of displaceability (e) based on the L above equation amounts to 9.32 mm.

Furthermore, in accordance with the present invention, the shape of the operating surfaces 24a and 24b of the engaging elements 24 of the drive wheel as compared to the shape for a constant engagement contact or mesh is corrected in a way such that the top halves of the operating surfaces 24a and 24b are bent backwardly towards the plane of symmetry 24c or tapered to an extent such that the deviation from the shape for the constant engagement contact within the zone of the top ends of the operating surfaces 24a and 24b is equal to the amount (e) of displaceability of the conveyor links. In FIG. 11 the shape of operating surfaces 24a and 24b for the constant engagement contact or mesh is indicated in phantom. With the present embodiment, such an uncorrected shape would conform to an involute-tooth system, although other common gear shapes are also possible. The corrected shape of the operating surfaces 24a and 24b is shown by the solid lines.

Alternatively, it is also possible, of course, to correct the upper halves of the operating surfaces 20a and 20b of engaging elements 20 of conveyor links 17 as compared to the shape for a constant engagement contact or mesh in a way such that the top halves of the acting surfaces are bent back towards the plane of symmetry or tapered to an extent such that the deviation of a pair of operating surfaces from the shape for a constant engagement contact within the zone of the operating surfaces 20a and 20b is equal to the amount (e) of displaceability of conveyor links 17. This alternative is described hereinafter in connection with FIG. 16.

Finally, the shape of operating surfaces 24a and 24b of engaging elements 24 of drive wheel 12 and, at the same time, the shape of operating surfaces 20a and 20b of engaging elements 20 of conveyor links 17 may be corrected as compared to the shape for constant engagement contact or mesh in a way such that the upper halves of operating surfaces 24a and 24b and operating surfaces 20a and 20b are bent back towards the plane of symmetry of each engaging element to an extent such that the sum of the deviations of a pair of operating surfaces 24a, 20b or 24b, 20a from the shape for constant engagement contact within the zone of the top ends of operating surfaces 24a and 24b or operating surfaces 20a and 20b is equal to the amount (e) of displaceability of conveyor links 17. This deviation, which represents a combination of the two embodiments described hereinabove, is not shown in detail in the drawing.

The mode of operation of the conveyor drive according to the present invention is explained in greater detail in the following with the help of FIGS. 9 and 11. It is assumed that drive wheel 12 is rotating clockwise in the drawing and that engaging elements 24 of the drive wheel mesh successively with the gaps between the engaging elements 20 of the conveyor links 17, whereby the chain of conveyor links 17 in FIG. 11 is moving from left to right. If engaging elements 20 have the normal spacing of pitch (t), the operating surfaces 20a and 20b thereof come into contact only with the lower halves of the operating surfaces 24a and 24b of the engaging elements 24 of drive wheel 12, which have the normal shape for a constant engagement contact or mesh contact.

However, if engaging elements 20 are displaced against each other or compressed in the longitudinal direction of the chain, as this is indicated, for example, for the left engaging element 20 in FIG. 11 by phantom lines, the operating surface 20b comes into contact first with the corrected top section of operating surface 24a of the left engaging element 24 without violently striking against this top section. As the intermediate space between engaging elements 24 is penetrated further by engaging elements 20, the operating surface 20b slides along operating surface 24a in the downward direction until reaching the uncorrected zone of surface 24a, where the conditions of division required for a constant mesh or engagement are restored. Said condition can be seen in FIG. 11 with the two right engaging elements 20.

FIG. 11 also shows that such a smooth meshing between the displaced engaging elements 20 and engaging elements 24 of drive wheel 12 is possible only if the amount (e) of displaceability is not exceeded. This amount (e) in turn is limited by the above equation. With a higher measure of mesh and correspondingly corrected engagement surfaces, i.e. surfaces corrected to a higher degree, a constant transfer of force, which is possible only within the lower uncorrected zone of engaging surfaces 24, would no longer be certain.

Figure 12:
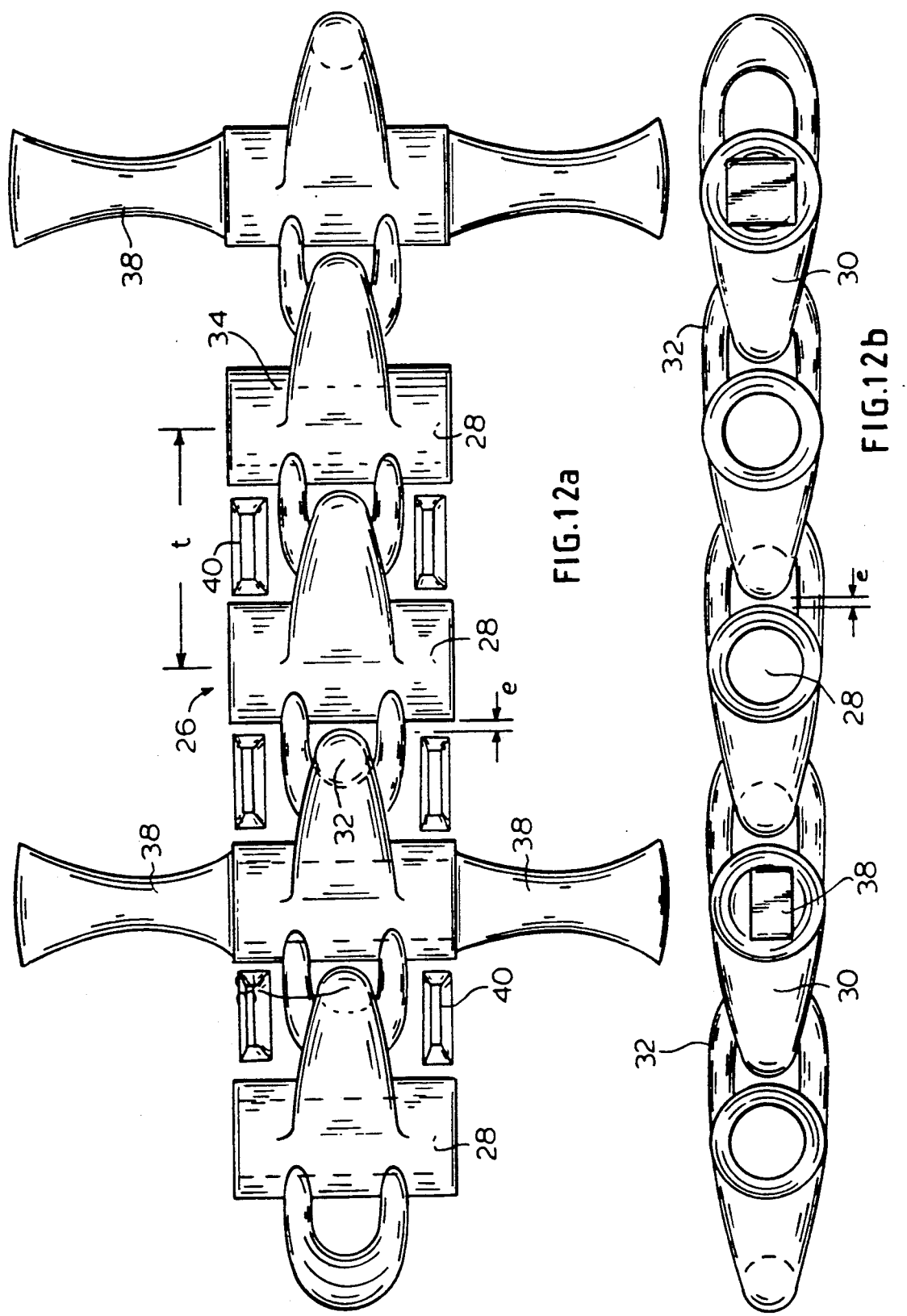
Figure 13:
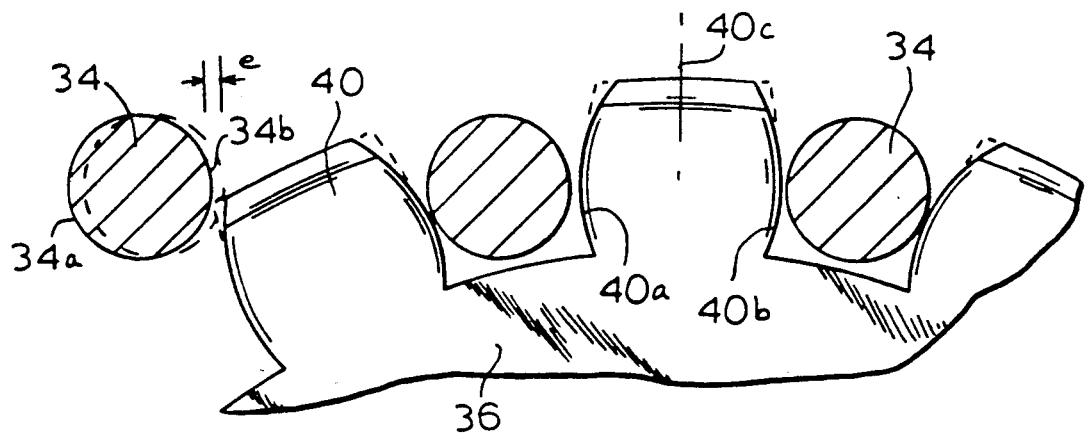
FIG. 13 is a view similar to FIG. 11 showing the engagement between the drive wheel and the engaging elements of the conveyor links of FIG. 12.

With the embodiment shown in FIGS. 12 and 13, each of the conveyor links assembled to form a chain is identified by the reference numeral 26. Each conveyor link 26 consists of a bolt 28 extending crosswise with respect to the longitudinal direction of the conveyor, with connecting elements in the form of ring-shaped eyes 30 and 32 being secured on opposite longitudinal sides of the bolt. The planes of extension of eyes 30 and 32 extend perpendicular to each other and one of said planes lies in the horizontal plane of the conveyor chain. Thus, eyes 30 and 32 of adjacent conveyor links 26 engage each other like a chain consisting of round links. These eyes 30 and 32 permit a limited amount of play between the conveyor links, however, said amount of play is substantially greater than required for the flexibility of the chain. Because of this play the conveyor links 26 can be displaced against each other by the amount (e).

The end sections on both sides of bolts 28 are designed as engaging elements 34 for engaging the drive wheel 36 of FIG. 13. Engaging elements 34 are provided with symmetrically arranged operating surfaces 34a and 34b (see FIG. 13).

FIG. 12 shows, furthermore, that with respect to some of the conveyor links 26, the bolt 28 is provided with scraping irons 38 or other conveying elements.

FIG. 13 shows a segment of drive wheel 36 meshing with its engaging elements 40 with the engaging elements 34 of the conveyor chain of FIG. 12 consisting of conveyor links 26. In the present case, engaging elements 40 of drive wheel 36 have the top halves of the operating surfaces 40a and 40b bent backwardly in an identical way to taper towards the plane of symmetry 40c of engaging element 40, as explained earlier in connection with FIG. 11.

The chain of conveyor links 26 shown in FIGS. 12 and 13 has the advantage of an especially small pitch (t), which means that the number (z) of engaging elements 40 on drive wheel 36 may be relatively high.

In FIGS. 14a to 14d there are shown four different embodiments of conveyor chains. These chains are guided and especially suited for the driving devices according to the present invention. Said chains of FIGS. 14a to 14d consist of elements which are identical in each case.

The chain in FIG. 14a basically conforms to the chain described in connection with FIG. 12. However, in the present case, the ends of the engaging elements are fitted on each outer side with guide attachments as shown in FIG. 9, where said attachments are identified by reference numeral 22.

Figure 14A:
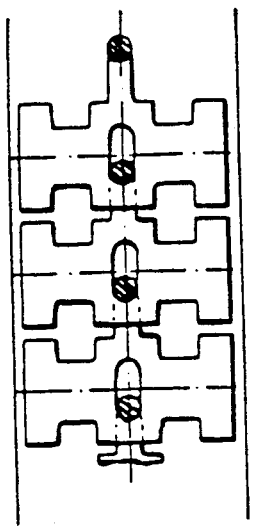
FIGS. 14a to 14d show schematic top views of various embodiments of conveyor chains guided in guide means, said chains being comprised of identical elements.
Figure 14B:
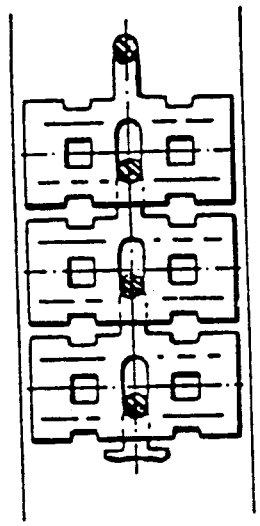

The chain in FIG. 14b is a modification of the chain in FIG. 14a to the extent that each conveyor link has two engaging elements arranged one after the other in the longitudinal direction of the chain.

Figure 14C:
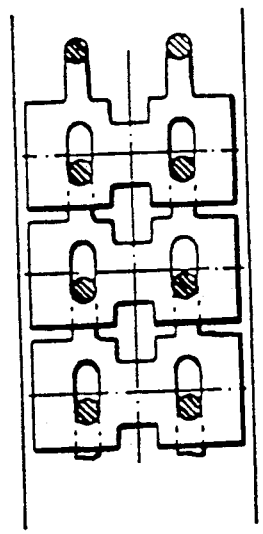
Figure 14D:
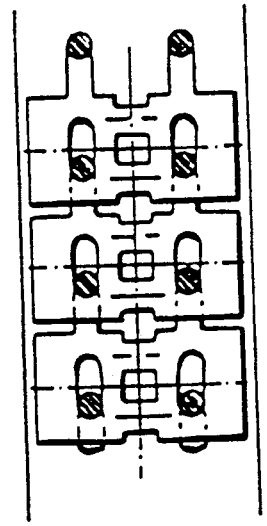

As compared to the chain in FIG. 14a, the chain in FIG. 14c has connection elements arranged in pairs between the conveyor links. The engaging elements are arranged in the center along the longitudinal axis of the chain. In the same way, the chain of FIG. 14d differs from the chain of FIG. 14b.

FIG. 15 shows ten additional embodiments of the chains, each chain being comprised of different individual elements.

Each of the chains of FIGS. 15a to 15e has connection elements disposed in the center along the center line of the chain and engaging elements disposed next to each other in pairs, whereas in the chains of FIGS. 15f to 15j, the engaging elements are disposed in the center along the center line and the connecting elements are arranged next to each other in pairs. In each case, the chain links differ from each other as to the number of engaging elements disposed one after the other when viewed in the longitudinal direction of the chain. For example, the chain in FIG. 15a has on its chain links an alternating arrangement of two and one engaging element(s); with the chain of FIG. 15b, all chain links have two engaging elements; with the chain of FIG. 15c, two engaging elements alternate with no engaging element; with the chain of FIG. 15d, which conforms to the chain shown in FIG. 9, one engaging element alternates with no element; and with the chain of FIG. 15e, each link of the chain has an engaging element. The chain of FIG. 15f, like the chain of FIG. 15a, has an arrangement in which two engaging elements alternate with one engaging element. The chain of FIG. 15g, like the chain of FIG. 15b, has two engaging elements on each link of the chain, and with the chain of FIG. 15h, like the chain of FIG. 15c, two engaging elements alternate with no element. The chain of FIG. 15i, like the chain of FIG. 15d, has one engaging element alternating with no engaging element; and with the chain of FIG. 15j, like the chain of FIG. 15e, each link of the chain has one engaging element.

Figure 16:
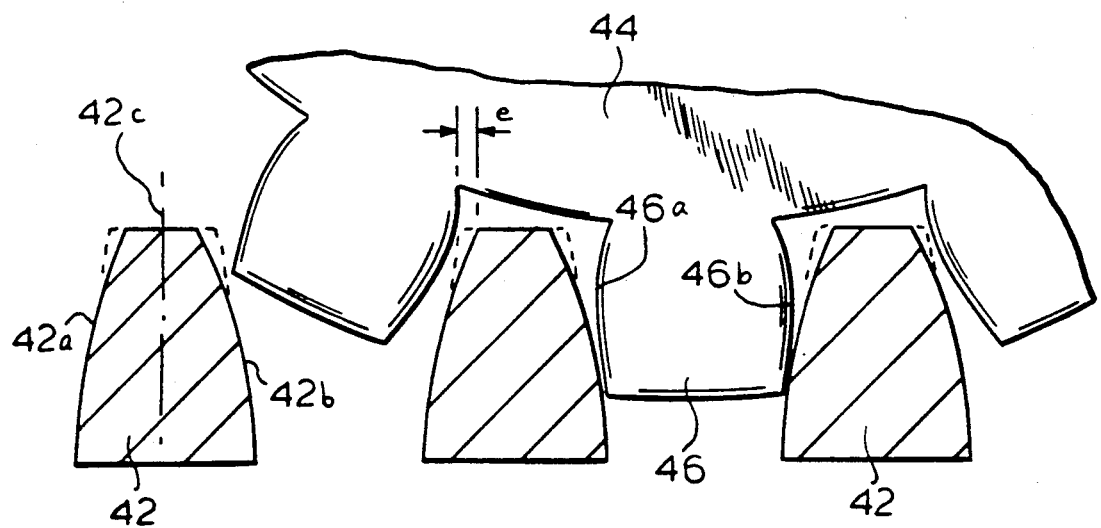
FIG. 16 is a view similar to FIG. 11 showing the engagement conditions between a drive wheel and a conveyor chain comprised of conveyor links having engaging elements shaped differently than those of FIG. 11.

In FIG. 16, in a representation similar to FIGS. 11 and 13, there is shown the conditions of engagement or mesh on a driving device according to the invention. However, in the present case, the operating surfaces of the engaging elements of the conveyor links and not those of the engaging elements of the drive wheel are corrected. In FIG. 16, the engaging elements of the conveyor links are identified by the reference numeral 42. The engaging elements 42 have operating surfaces 42a and 42b which, in their lower zone have the form or shape of a trapezoidal gearing, while in their upper halves are bent back or tapered towards the plane of symmetry 42c in a way such that the highest permissible measure of correction (e) is obtained based on the calculation according to the above equation. The drive wheel 44 with its engaging elements 46 engages the engaging elements 42 of the conveyor links; the operating surfaces 46a and 46b of engaging elements 46 have the required involute shape required for constant engagement. Also with this embodiment, the engaging elements 42 may be displaced in the horizontal direction by the amount (e) without impairing safe meshing.

Figure 17:
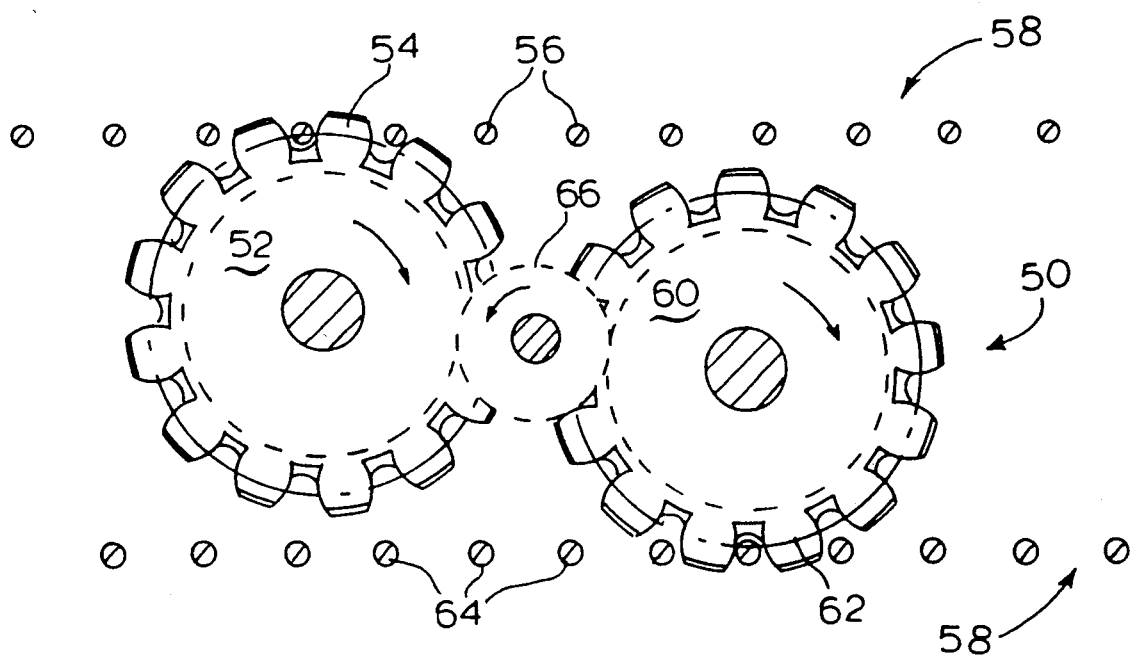
FIG. 17 is a schematic side elevational view of an intermediate drive of the conveyor showing two drive wheels.

In FIG. 17 an embodiment of the present invention is shown where the intermediate drive 50 for the conveyor includes a drive wheel 52 whose engaging elements 54 engage upper stringer 56 of endless chain 58 and a drive wheel 60 whose engaging elements 62 engage lower stringer 64 of the endless chain. A common drive, designated 66, drives drive wheels 52 and 60 of intermediate drive 50.

While a few embodiments of the present invention have been shown and described, it will be obvious that many changes and modifications may be made thereunto without departing from the spirit and scope of the invention.

What is claimed is:

1. A conveyor having a fixed length without a tensioner for chain thereof, said conveyor comprising:
   (a) conveyor frame means having a fixed length and consisting of multi directionally articulated frame segments;
   (b) a freely compressible, endless, guided chain having upper and lower stringers and consisting of chain links having driving surfaces, said chain links being interconnected by connecting link means which permit movement between individual chain links into an elongated and compressed state corresponding to first and second chain pitches, respectively;
   (c) conveying elements connected to at least some of said chain links for conveying purposes;
   (d) drive means for said chain consisting of a plurality of intermediate drives wherein each of said intermediate drives comprises a drive wheel; and
   (e) a plurality of drive teeth associated with each drive wheel and engaging in the upper and lower stringers of said chain so as to drive said chain, each of said drive teeth having driving surfaces and a profile adapted to allow smooth engagement with said chain as said chain enters said drive wheels when said chain is in the elongated state and in the compressed state, said drive teeth wedging between the driving surfaces of adjacent compressed chain links when said chain is in the compressed state of said second pitch so as to spread said links apart, said profile further allowing smooth disengagement from said chain as said chain leaves said drive wheels wherein the maximum amount of movement between individual chain link means is determined by the formula:

$$e = \frac{0.3t}{z}(z - 9)$$

wherein:
e = the amount of movement,
t = the pitch of said drive wheel, and
z = the number of drive teeth of said drive wheel, where the number of teeth is at least ten, and
the top flanks of said drive teeth beginning in the region of the middle of the depth thereof are gradually symmetrically tapered in the direction of the tips thereof, deviating in the region of the tips from the toothing as determined for constant mesh by the amount of the displaceable movement between links.

2. A conveyor having a fixed length without a tensioner for a chain thereof, said conveyor comprising:
   (a) conveyor frame means having a fixed length and consisting of multi directionally articulated frame segments;
   (b) a freely compressible, endless, guided chain having upper and lower stringers and consisting of chain links having driving surfaces, said chain links being interconnected by connecting link means which permit movement between individual chain links into an elongated and compressed state corresponding to first and second chain pitches, respectively;
   (c) conveying elements connected to at least some of said chain links for conveying purposes;
   (d) drive means for said chain consisting of a plurality of intermediate drives wherein each of said intermediate drives comprises a drive wheel; and
   (e) a plurality of drive teeth associated with each drive wheel and engaging in the upper and lower stringers of said chain so as to drive said chain, each of said drive teeth having driving surfaces and a profile adapted to allow smooth engagement with said chain as said chain enters said drive wheels when said chain is in the elongated state and in the compressed state, said drive teeth wedging between the driving surfaces of adjacent compressed chain links when said chain is in the compressed state of said second pitch so as to spread said links apart, said profile further allowing smooth disengagement from said chain as said chain leaves said drive wheels wherein the maximum amount of movement between individual chain link means is determined by the formula:

$$e = \frac{0.3t}{z}(z - 9)$$

wherein:
e = the amount of movement,
t = the pitch of said drive wheel, and
z = the number of drive teeth of said drive wheel, where the number of teeth is at least ten, and
the top flanks of the driving surfaces of said chain links beginning in the region of the middle of the depth thereof are gradually symmetrically tapered in the direction of the tips thereof, deviating in the region of the tips from the toothing as determined for constant mesh by the amount of the displaceable movement between links.

3. A conveyor having a fixed length without a tensioner for a chain thereof, said conveyor comprising:
   (a) conveyor frame means having a fixed length and consisting of multi directionally articulated frame segments;
   (b) a freely compressible, endless, guided chain having upper and lower stringers and consisting of chain links having driving surfaces, said chain links being interconnected by connecting link means which permit movement between individual chain links into an elongated and compressed state corresponding to first and second chain pitches, respectively;
   (c) conveying elements connected to at least some of said chain links for conveying purposes;
   (d) drive means for said chain consisting of a plurality of intermediate drives wherein each of said intermediate drives comprises a drive wheel; and (e) a plurality of drive teeth associated with each drive wheel and engaging in the upper and lower stringers of said chain so as to drive said chain, each of said drive teeth having driving surfaces and a profile adapted to allow smooth engagement with said chain as said chain enters said drive wheels when said chain is in the elongated state and in the compressed state, said drive teeth wedging between the driving surfaces of adjacent compressed chain links when said chain is in the compressed state of said second pitch so as to spread said links apart, said profile further allowing smooth disengagement from said chain as said chain leaves said drive wheels wherein the maximum amount of movement between individual chain link means is determined by the formula:

$$e = \frac{0.3t}{z}(z - 9)$$

wherein:

e = the amount of movement,
t = the pitch of said drive wheel, and
z = the number of drive teeth of said drive wheel, where the number of teeth is at least ten, and the top flanks of the drive wheel teeth and of the driving surfaces of said chain links beginning in the region of the middle of the depth thereof are gradually symmetrically tapered in the direction of the tips thereof, deviating in the region of the tips from the toothing as determined for constant mesh, the sum of the deviations of a drive wheel tooth and driving surface of said chain link being equal to the amount of the displaceable movement between links.

4. The conveyor as defined in claim 1, which further comprises support elements downwardly extendable from said conveyor frame so that the conveyor chain reversing in the lower stringer is lifted from the ground when said support elements are extended and lies on the ground when said support elements are retracted, and steering cylinders between the frame segments in the front region of the conveyor for adjusting the angle therebetween.

5. The conveyor as defined in claim 1, wherein each intermediate drive includes two drive wheels, the teeth of one directly engaging in the upper stringer of said conveyor chain and the teeth of the other directly engaging in the lower stringer of said conveyor chain.

6. The conveyor as defined in claim 1, wherein the intermediate drives are supported by said conveyor frame by segments which do not exceed the length of two segments disposed between said intermediate drives.

7. The conveyor as defined in claim 1, wherein each said conveyor link is comprised of a bolt extending transversely to the longitudinal direction of the conveyor chain and having connecting elements connecting said link to adjacent links in the form of ring shaped eyes secured to the longitudinal sides of said bolt at the front and rear thereof, the plane defined by said eyes being perpendicular to each other and one of said planes being parallel to the plane of the horizontal conveyor links.

8. The conveyor as defined in claim 2, which further comprises support elements downwardly extendable from said conveyor frame so that the conveyor chain reversing in the lower stringer is lifted from the ground when said support elements are extended and lies on the ground when said support elements are retracted, and steering cylinders between the frame segments in the front region of the conveyor for adjusting the angle therebetween.

9. The conveyor as defined in claim 2, wherein each intermediate drive includes two drive wheels, the teeth of one directly engaging in the upper stringer of said conveyor chain and the teeth of the other directly engaging in the lower stringer of said conveyor chain.

10. The conveyor as defined in claim 2, wherein the intermediate drives are supported by said conveyor frame by segments which do not exceed the length of two segments disposed between said intermediate drives.

11. The conveyor as defined in claim 2, wherein each said conveyor link is comprised of a bolt extending transversely to the longitudinal direction of the conveyor chain and having connecting elements connecting said link to adjacent links in the form of ring shaped eyes secured to the longitudinal sides of said bolt at the front and rear thereof, the plane defined by said eyes being perpendicular to each other and one of said planes being parallel to the plane of the horizontal conveyor links.

12. The conveyor as defined in claim 3, which further comprises support elements downwardly extendable from said conveyor frame so that the conveyor chain reversing in the lower stringer is lifted from the ground when said support elements are extended and lies on the ground when said support elements are retracted, and steering cylinders between the frame segments in the front region of the conveyor for adjusting the angle therebetween.

13. The conveyor as defined in claim 3, wherein each intermediate drive includes two drive wheels, the teeth of one directly engaging in the upper stringer of said conveyor chain and the teeth of the other directly engaging in the lower stringer of said conveyor chain.

14. The conveyor as defined in claim 3, wherein the intermediate drives are supported by said conveyor frame by segments which do not exceed the length of two segments disposed between said intermediate drives.

15. The conveyor as defined in claim 3, wherein each said conveyor link is comprised of a bolt extending transversely to the longitudinal direction of the conveyor chain and having connecting elements connecting said link to adjacent links in the form of ring shaped eyes secured to the longitudinal sides of said bolt at the front and rear thereof, the plane defined by said eyes being perpendicular to each other and one of said planes being parallel to the plane of the horizontal conveyor links.

* * * * *